(12) United States Patent
Peccianti et al.

(10) Patent No.: US 8,599,887 B2
(45) Date of Patent: Dec. 3, 2013

(54) STABLE MODE-LOCKED LASER FOR HIGH REPETITION RATE OPERATION

(75) Inventors: Marco Peccianti, Rome (IT); Alessia Pasquazi, Rome (IT); David Moss, Croydon (AU); Roberto Morandotti, Montreal (CA)

(73) Assignee: Institut National de la Recherche Scientifique (INRS), Quebec (CA)

( * ) Notice: Subject to any disclaimer, the term of this patent is extended or adjusted under 35 U.S.C. 154(b) by 0 days.

(21) Appl. No.: 13/325,891

(22) Filed: Dec. 14, 2011

(65) Prior Publication Data
US 2013/0156051 A1   Jun. 20, 2013

(51) Int. Cl.
*H01S 3/098* (2006.01)

(52) U.S. Cl.
USPC ......... 372/18; 372/6; 372/20; 372/21; 372/94

(58) Field of Classification Search
USPC ...................... 372/6, 94, 18, 20, 21
See application file for complete search history.

(56) References Cited

U.S. PATENT DOCUMENTS

| | | | | |
|---|---|---|---|---|
| 6,567,436 | B1 * | 5/2003 | Yao et al. | 372/32 |
| 7,050,212 | B2 * | 5/2006 | Matsko et al. | 359/245 |
| 7,630,417 | B1 * | 12/2009 | Maleki et al. | 372/20 |
| 2004/0100675 | A1 * | 5/2004 | Matsko et al. | 359/245 |
| 2006/0013273 | A1 * | 1/2006 | Menon et al. | 372/32 |
| 2006/0187537 | A1 * | 8/2006 | Huber et al. | 359/337.22 |

OTHER PUBLICATIONS

Jiao, Z. J., et al., C-Band InAs/InP Quantum Dot Semiconductor Mode-Locked Laser Emitting 403-GHz Repetition Rate Pulses. IEEE Photonic Tech. 23, 543-545 (2011).

Yoshida, E. & Nakazawa, M., Low-threshold 115-GHz continuous-wave modulational-instability erbium-doped fibre laser. Opt. Lett. 22, 1409-1411(1997).
Sylvestre, T., et al., Self-induced modulational instability laser revisited: normal dispersion and dark-pulse train generation. Opt. Lett. 27, 482-484 (2002).
Schroder, J., Vo, T. D. & Eggleton, B., Repetition-rate-selective, wavelength-tunable mode-locked laser at up to 640 GHz. Opt. Lett. 34, 3902-3904 (2009).
Schröder, J., et al., Dynamics of an ultrahigh-repetition-rate passively mode-locked Raman fibre laser. J. Opt. Soc. Am. B 25, 1178-1186 (2008).
Peccianti et al. Subpicosecond 200GHz Soliton . . . Resonator—OSA Technical Digest. Conf. on Lasers . . . (2010). <http://www.opticsinfobase.org/abstract.cfm?URI=CLEO-2010-CPDA9>.
Peccianti et al. Ultra High Speed Soliton Laser—OSA Technical Digest (CD). Nonlinear Photonics NThD3 (2010). <http://www.opticsinfobase.org/abstract.cfm?URI=NP-2010-NThD3>.

* cited by examiner

*Primary Examiner* — Yuanda Zhang

(57) ABSTRACT

A laser system comprises a high-Q nonlinear optical resonator, a cavity comprising an amplifying element and a dispersive element, an optical delay line adapted to tune the length of the cavity, and a large pass-band filter adapted to tune the cavity's central oscillation wavelength, the nonlinear optical resonator being selected with a linewidth ($LW_R$) comparable to the cavity free-spectral range ($FSR_C$). There is provided a method for generating highly stable pulse streams, comprising providing a cavity comprising an amplifying element and a dispersive element; selecting a high-Q nonlinear optical resonator with a linewidth ($LW_R$) comparable to the cavity free-spectral range ($FSR_C$); tuning the length of the cavity; and tuning the cavity's central oscillation wavelength.

7 Claims, 10 Drawing Sheets

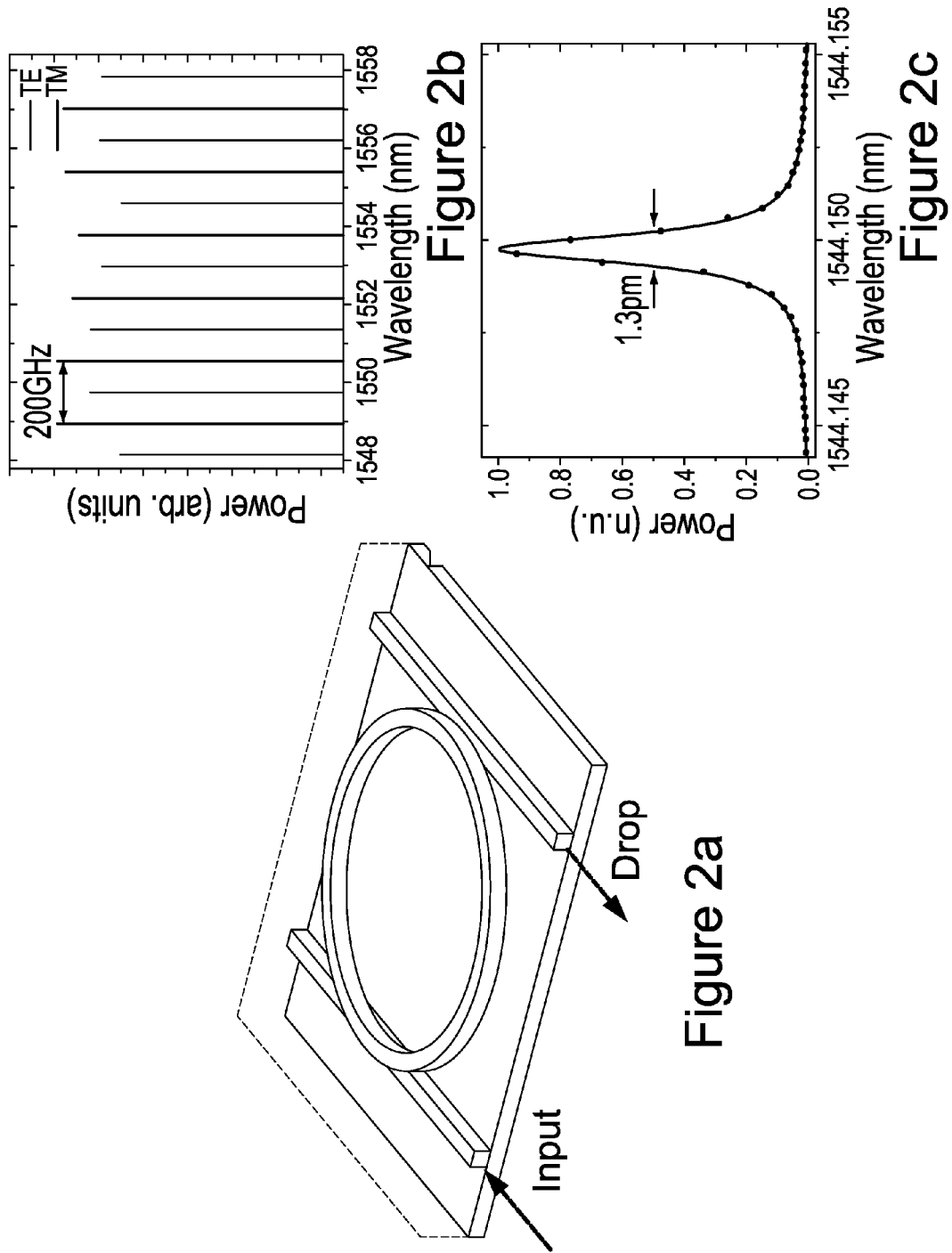

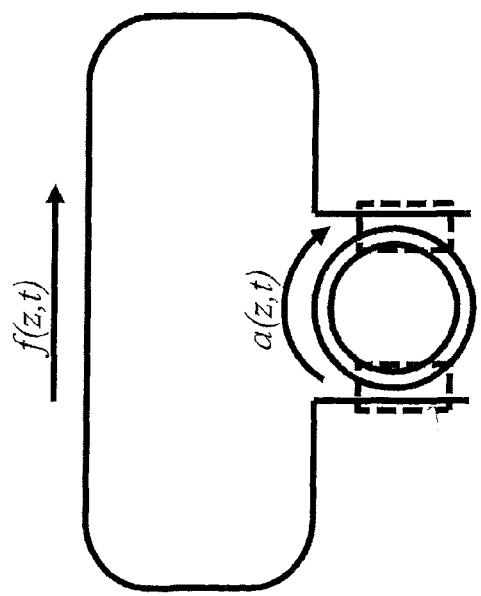
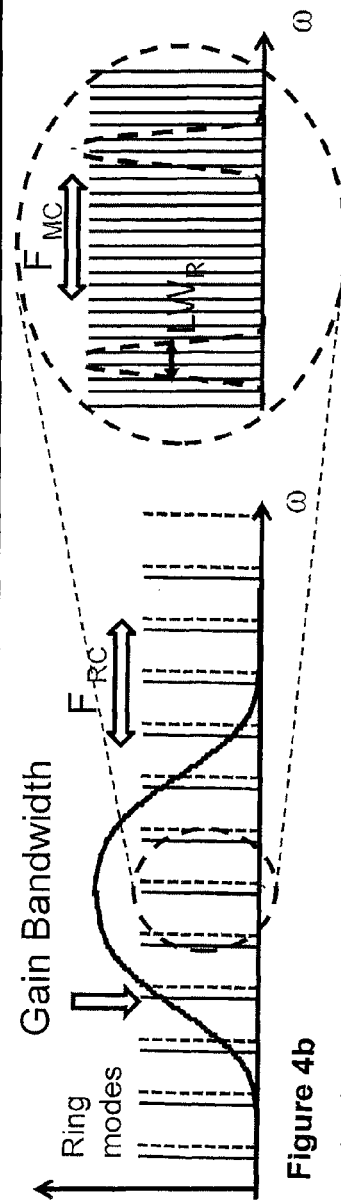

Figure 4a

Figure 4b
Optical output = $f(0,t)$
Radio Frequency (RF) output = $|f(0,t)|^2$

Figure 4c

Figure 4d $$\partial_z f(z,t) + \partial_t f(z,t) \frac{n_F}{c} + i\frac{\beta_{2F}}{2}\partial_{tt}f(z,t) =$$
$$= g(f)\left(1 - \frac{\partial_t}{\Omega}\right)f(z,t) - \alpha f(z,t) \quad (1)$$

$$\partial_z a(z,t) + \partial_t a(z,t)\frac{n_F}{c} + i\frac{\beta_{2R}}{2}\partial_{tt}a(z,t) + \gamma|a(z,t)|^2 a(z,t) = 0 \quad (2)$$

$$g(f) = G_0\left[Exp\left(-\int_0^L |f(z,t)|^2 \frac{dz}{P_0 L}\right)\right]$$
$$\begin{pmatrix} a_{out} \\ f_{out} \end{pmatrix} = \begin{pmatrix} t & r \\ -r & t \end{pmatrix}\begin{pmatrix} a_{in} e^{i\Phi_{RC}} \\ f_{in} e^{i\Phi_{MC}} \end{pmatrix} \quad (3)$$

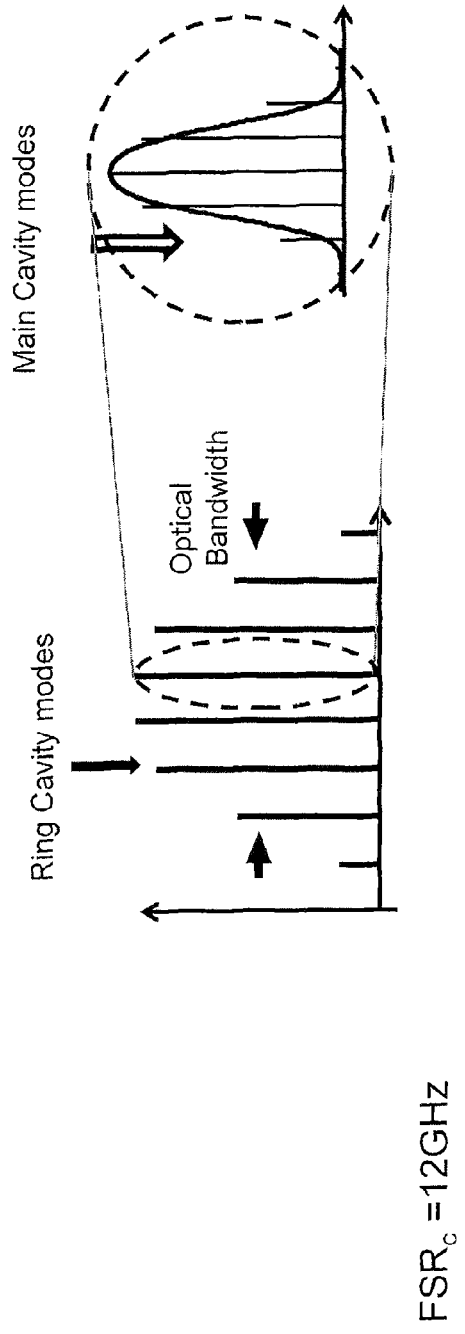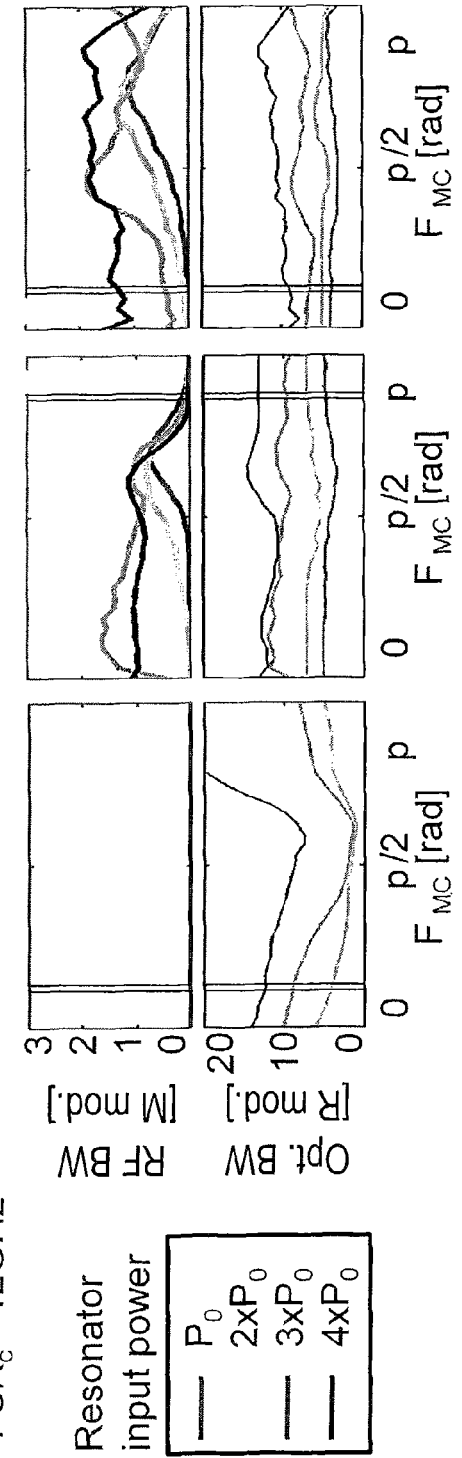
Figure 5a  Figure 5b  Figure 5c
Figure 5d

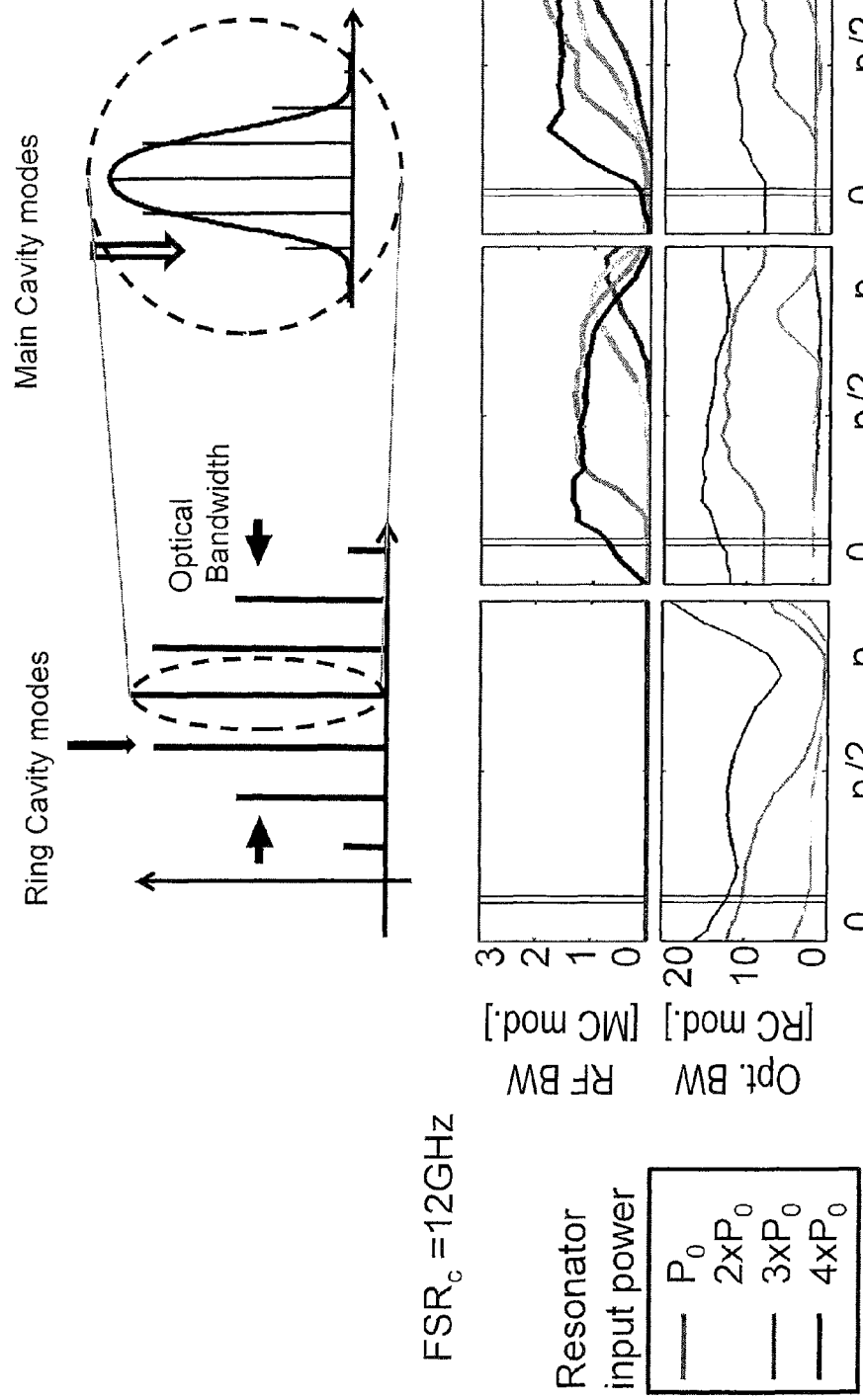

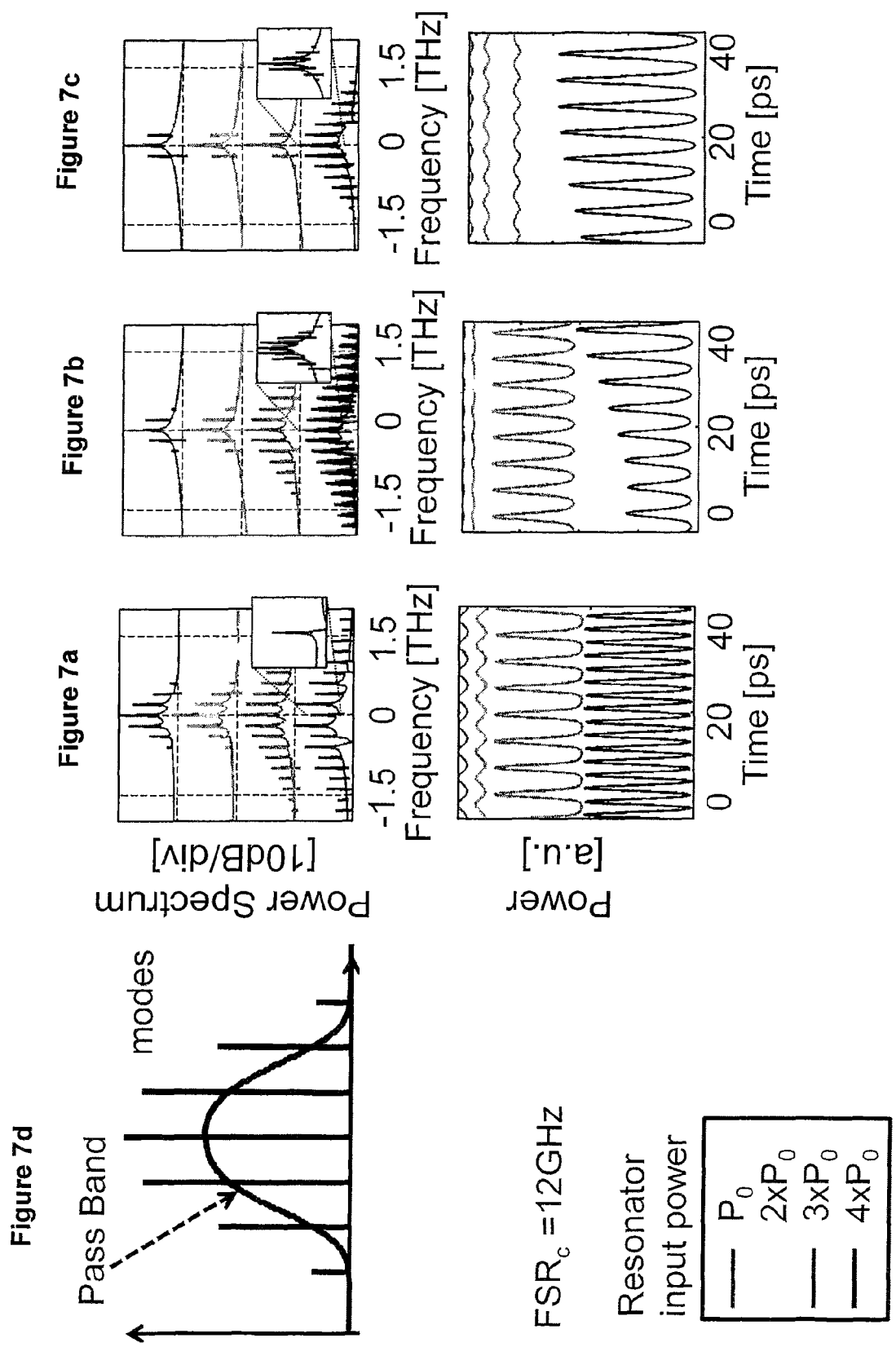

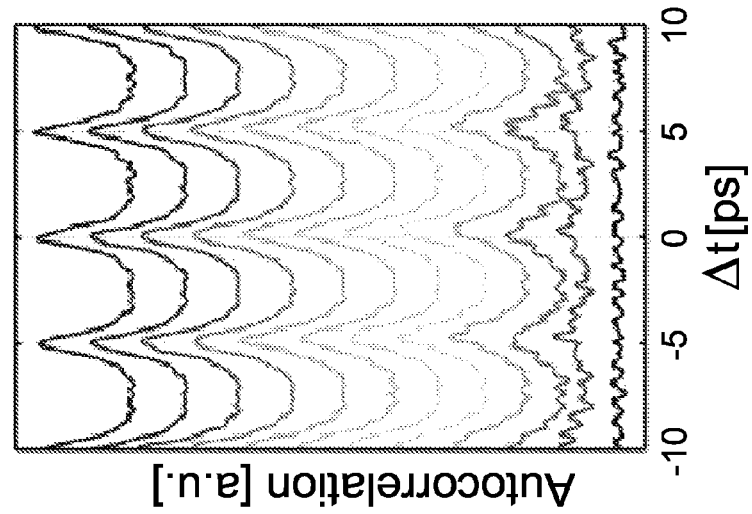
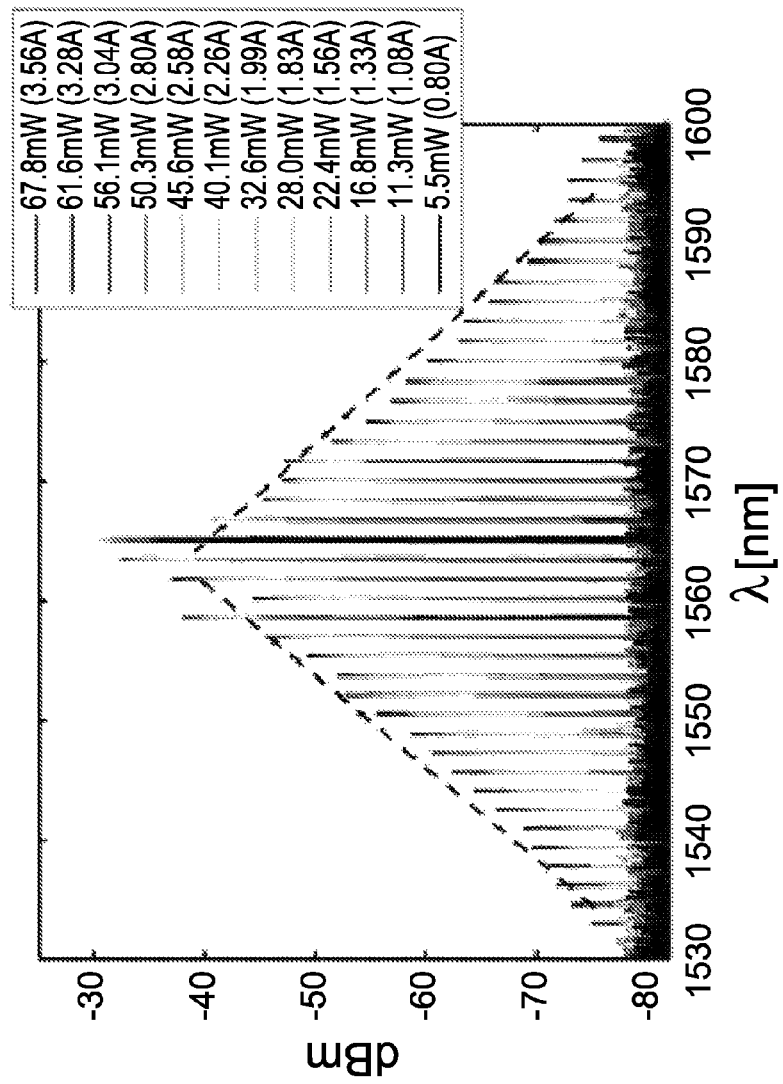
Figure 8a
Figure 8b (A) 7mW
(B) 11.4mW
(C) 14mW
(D) 15.4mW

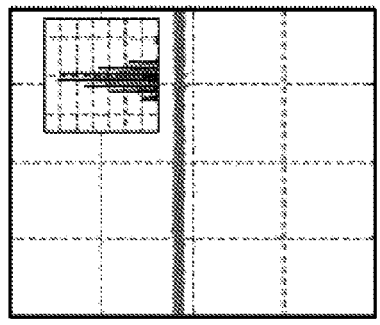
Figure 10a
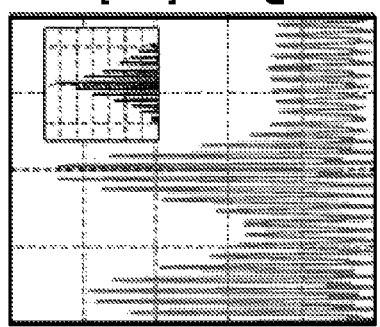
Figure 10b
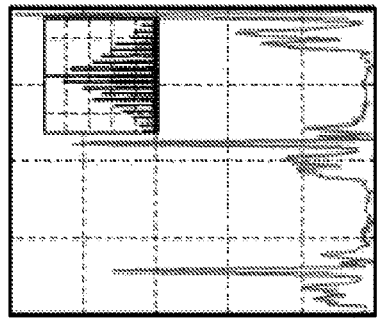
Figure 10c
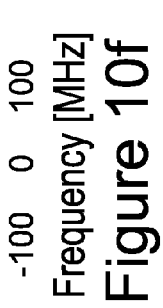
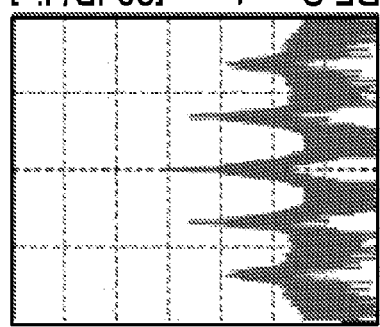
Figure 10e
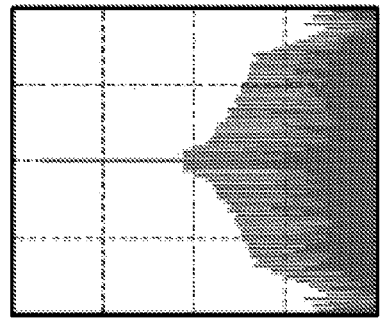
Figure 10d
Figure 10f

STABLE MODE-LOCKED LASER FOR HIGH REPETITION RATE OPERATION

FIELD OF THE INVENTION

The present invention relates to a stable mode-locked laser for high repetition rate operation. More specifically, the present invention is concerned with a stable mode-locked laser for high frequency operation based on nonlinear resonators.

BACKGROUND OF THE INVENTION

In standard high repetition rate lasers, the repetition rate is given by the frequency spacing of the modes of the laser cavity. Repetition rates above 100 GHz can be achieved only with cavity lengths of few millimeters or shorter, as in state-of-the-art semiconductor lasers. The minimum width of the lines composing the emission spectrum of those lasers is relatively large since this width increases with the mode separation, i.e. as the length of the main cavity shortens.

Dissipative Four Wave Mixing Lasers (DFWM) are lasers providing high repetition rates. However, in their standard implementation they generate very unstable pulse trains that exhibit severe random amplitude modulations. Due to this inherent instability, the width of the lines composing the laser emission spectrum is usually very large. DFWM lasers have presently a negligible impact on ultrafast laser applications.

DFWM lasers are based on a long laser cavity. In a passive mode-locking laser system, the repetition rate is fixed by the frequency spacing, i.e. the free spectral range (FSR) between the spectral resonances associated with each cavity mode. In DFWM, a resonant filter placed intracavity is used to periodically suppress groups of cavity resonances, thereby increasing the frequency separation between two adjacent oscillating cavity modes. This method can be used to set the repetition rate to an arbitrary multiple of the main cavity FSR. A nonlinear element placed in the main cavity induces an energy exchange between those cavity modes, thereby maintaining their mutual phase, hence mode-locking them. However, state-of-the art DWFM systems require main cavities consisting in 10-50 meters of nonlinear fiber and 5-10 meters of amplification fiber to sustain the mode-locked regime. The main cavity FSR is then very low and many cavity modes fall within the bandwidth of each filter resonance. In the practice, the output spectrum consists in groups of closely spaced oscillating lines of similar gain and random phase. The beating of those modes produces strong low frequency amplitude modulation of the generated laser pulsed train.

Currently, there is no laser system capable natively of stable operation at repetition rates above 100 GHz with the characteristic linewidth of a long cavity laser.

SUMMARY OF THE INVENTION

More specifically, there is provided a laser system, comprising a high-Q nonlinear optical resonator, a cavity comprising an amplifying element and a dispersive element, an optical delay line adapted to tune the length of the cavity, and a large pass-band filter adapted to tune the cavity's central oscillation wavelength, the nonlinear optical resonator being selected with a linewidth ($LW_R$) comparable to the cavity free-spectral range ($FSR_C$).

There is further provided a method for generating highly stable pulse streams, comprising providing a cavity comprising an amplifying element and a dispersive element; selecting a high-Q nonlinear optical resonator with a linewidth ($LW_R$) comparable to the cavity free-spectral range ($FSR_C$); tuning the length of the cavity; and tuning the cavity's central oscillation wavelength There is further provided a method for producing a laser source with a narrow modal linewidth and providing highly stable trains of short optical pulse at a repetition rate higher than 100 GHZ, comprising providing a cavity comprising an amplifying element and a dispersive element; selecting a high-Q nonlinear optical resonator with a linewidth ($LW_R$) comparable to the cavity free-spectral range ($FSR_C$); tuning the length of the cavity; and tuning the cavity's central oscillation wavelength.

Other objects, advantages and features of the present invention will become more apparent upon reading of the following non-restrictive description of embodiments thereof, given by way of example only with reference to the accompanying drawings.

BRIEF DESCRIPTION OF THE DRAWINGS

In the appended drawings:

FIG. 1b shows the output in time, consisting of a train of pulses with a repetition rate defined by the free spectral range of the nonlinear resonator, of the system of FIG. 1a;

FIG. 2a is a schematic view of an integrated ring resonator, assembled using coupled single mode waveguides, according to an embodiment of the present invention; FIG. 2b shows the typical transmission spectrum of the ring resonator of FIG. 2a used for two orthogonal input field polarizations (TE and TM); FIG. 2c shows a detail of the transmission spectrum of FIG. 2b around a single TM ring resonance;

FIGS. 4a-4d show a definition of control parameters in a numerical analysis according to an embodiment of an aspect of the present invention: FIG. 4a is a schematic of the system of FIG. 3; FIG. 4b is a graph of an optical output of the system of FIG. 4a; FIG. 4c shows a detail of the output of FIG. 4b; and FIG. 4d shows a set of equation of a numerical analysis of the system schematized in FIG. 4a;

FIGS. 5 show results of the simulation in the case of an even number of modes within the gain bandwidth with $FR_c=p/2$ (FIG. 5d), at $FSRc=4.0\ LW_R$ (FIG. 5a), $FSRc=0.8\ LW_R$ (FIG. 5b) and $FSRc=0.4\ LW_R$ (FIG. 5c), at different resonator input powers;

FIGS. 6 show results of the simulation in the case of an odd number of modes within the gain bandwidth with $FR_c=p/2$ (FIG. 6d), at $FSRc=4.0\ LW_R$ (FIG. 6a), $FSRc=0.8\ LW_R$ FIG. 6b and $FSRc=0.4\ LW_R$ (FIG. 6c) at different resonator input powers;

FIGS. 7 show results of the simulation in the case of an even number of modes within the gain bandwidth with $FR_c=0$ (FIG. 7d), at $FSRc=4.0\ LW_R$ (FIG. 7a), $FSRc=0.8\ LW_R$ (FIG. 7b) and $FSRc=0.4\ LW_R$ (FIG. 7c), at different resonator input powers;

FIG. 8 shows a typical output spectrum (a) and autocorrelation (b) for a comparable system (unstable) obtained using a long main cavity (unstable configuration), the main cavity having $FSR_C=6$ MHz (33 meter of SMF), for different resonator input powers, from 5.5 to 67.8 mW (input powers and the amplifier pump currents are indicated in the inset);

FIG. 10 shows a consistent comparison of the stability of a system according to an embodiment of an aspect of the present invention with long cavity systems of the prior art: (a, d): stable case, $FSR_C$=67 MHz, in the stable case the DC line exhibits Sub-Hz width at −60 dB and 150 Hz width at −80 dB; (b, e): unstable case, $FSR_C$=67 MHz and different phase delay; (c, f): unstable case, $FSR_C$=6 MHz; (d): $P_{DC}/P_{noise} \approx 41$ dB (8 bit-sampling limited); and (f): $P_{DC}/P_{noise} \approx -13$ dB.

DESCRIPTION OF EMBODIMENTS OF THE INVENTION

There is generally provided a method and a system to produce a laser with very narrow modal linewidth providing highly stable trains of short optical pulse at a very high repetition rate.

In a nutshell, there is provided a dispersive active cavity in which a pass-band filter and a high quality factor (Q) nonlinear resonator are inserted. The cavity length is accurately tuned, with a delay line, so that the one main cavity mode oscillates centered within each resonator band. A pass-band filter shapes the main cavity gain and selects the central oscillation frequency. The line width of the resonator is narrow enough to let only one main cavity mode per resonator resonance to oscillate, hence achieving stable operation.

Figure 1A:
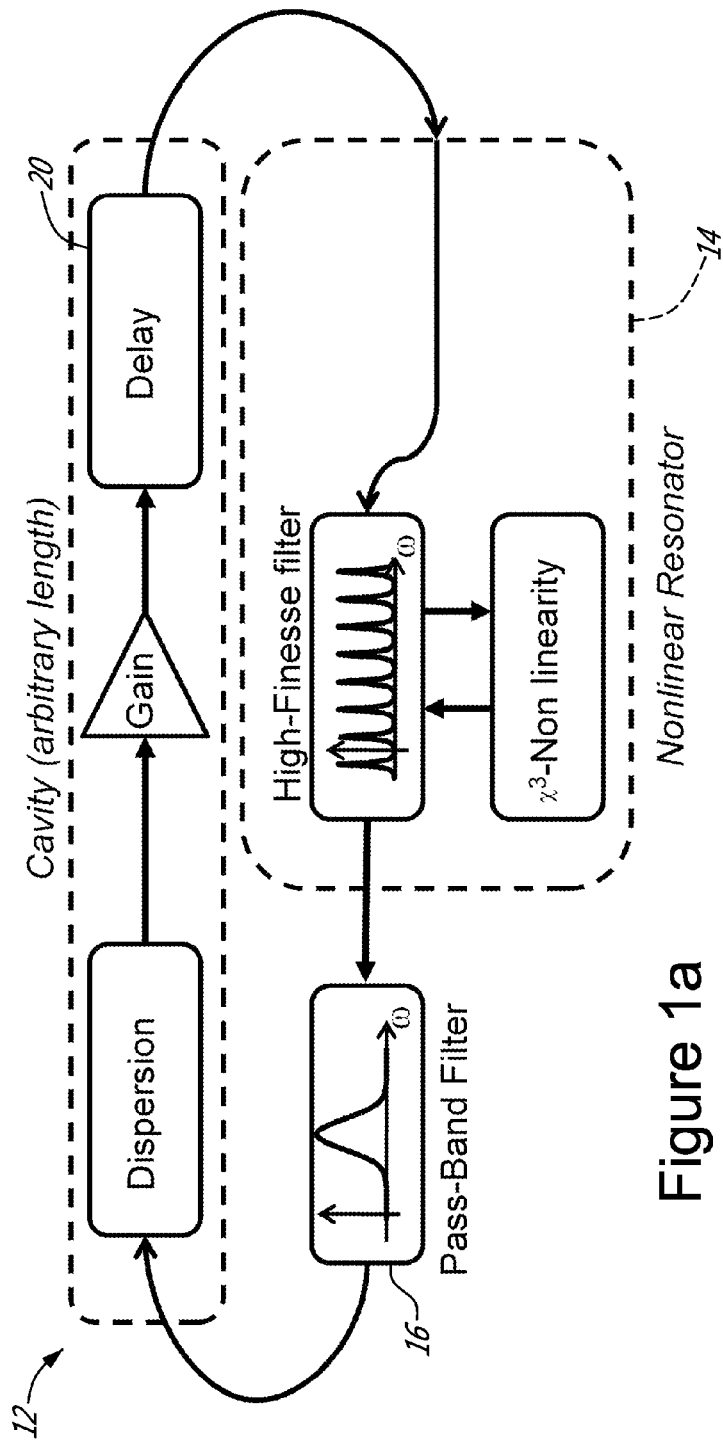
FIG. 1a is a schematic view of a laser system according to an embodiment of an aspect of the present invention.
Figure 1B:
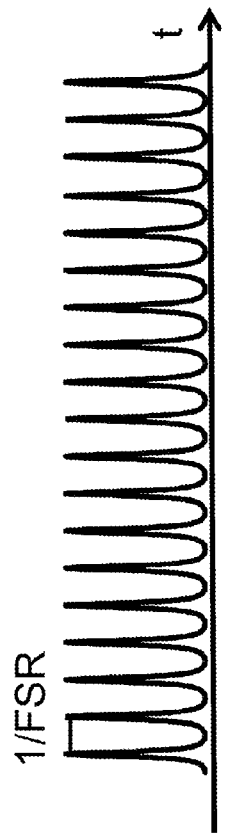

FIG. 1 shows a dispersive active cavity 12 comprising a pass-band filter 16 and a high-Q nonlinear optical resonator 14. The nonlinear optical resonator 14 is selected with linewidth ($LW_R$) comparable to the main cavity free-spectral range ($FSR_C$) and a free spectral range ($FSR_R$), defining the repetition rate of the mode-locked laser.

The cavity 12 may consists of a standard single-mode fiber (SMF-28), which provides the dispersion and connects the different elements, and an Erbium-doped fiber amplifier 18, which provides both dispersion and optical amplification. The length of the cavity is accurately tuned with a delay line 20.

The high-Q nonlinear optical resonator 14 may be a ring resonator, as shown in FIG. 2a for example providing Q=1.2× $10^6$, and $FSR_R$=200.8 GHz, i.e. a resonator bandwidth $LW_R$<160 MHz and a cavity field enhancement factor greater than 17, constituted by a waveguide with effective Kerr nonlinearities per unit of resonator loop length γ=0.2$W^{-1}$ m (see FIG. 2). FIG. 2b shows the typical transmission spectrum of the ring resonator used for the demonstration for two orthogonal input field polarizations (TE and TM). FIG. 2c shows a detail of the transmission spectrum around a single TM ring resonance.

The nonlinear resonator has a very high-Q, hence a very narrow linewidth $LW_R$. Such a high Q greatly enhances the internal optical field intensity at the resonance frequencies. This corresponds to an enhancement of the nonlinearity and in a lower input power required to induce an effective four-wave-mixing. Hence, the energy in the laser cavity can be smaller, and consequently the external cavity length required to properly amplify the signal can be shorter. In case of a short external cavity, but still of order of magnitudes longer than the nonlinear resonator optical cavity, the modal separation in frequency is sufficient to let oscillate only one mode for each resonator resonance. This condition allows stable operation. In the case of stable operation, the tunability of the external cavity length allows operations having one external cavity mode within each resonator resonance. The optical delay line controls both the phase and group delay in the external cavity.

A stable pulse train is obtained when the pulse coupled in the nonlinear resonator overlaps exactly the pulse circulating inside it. This condition occurs when the external cavity group delay is approximately a multiple of the nonlinear resonator optical round trip time. It is noted that, in similar devices with long main cavity, the tunability of the main cavity length is irrelevant as the emission is always unstable.

Figure 3:
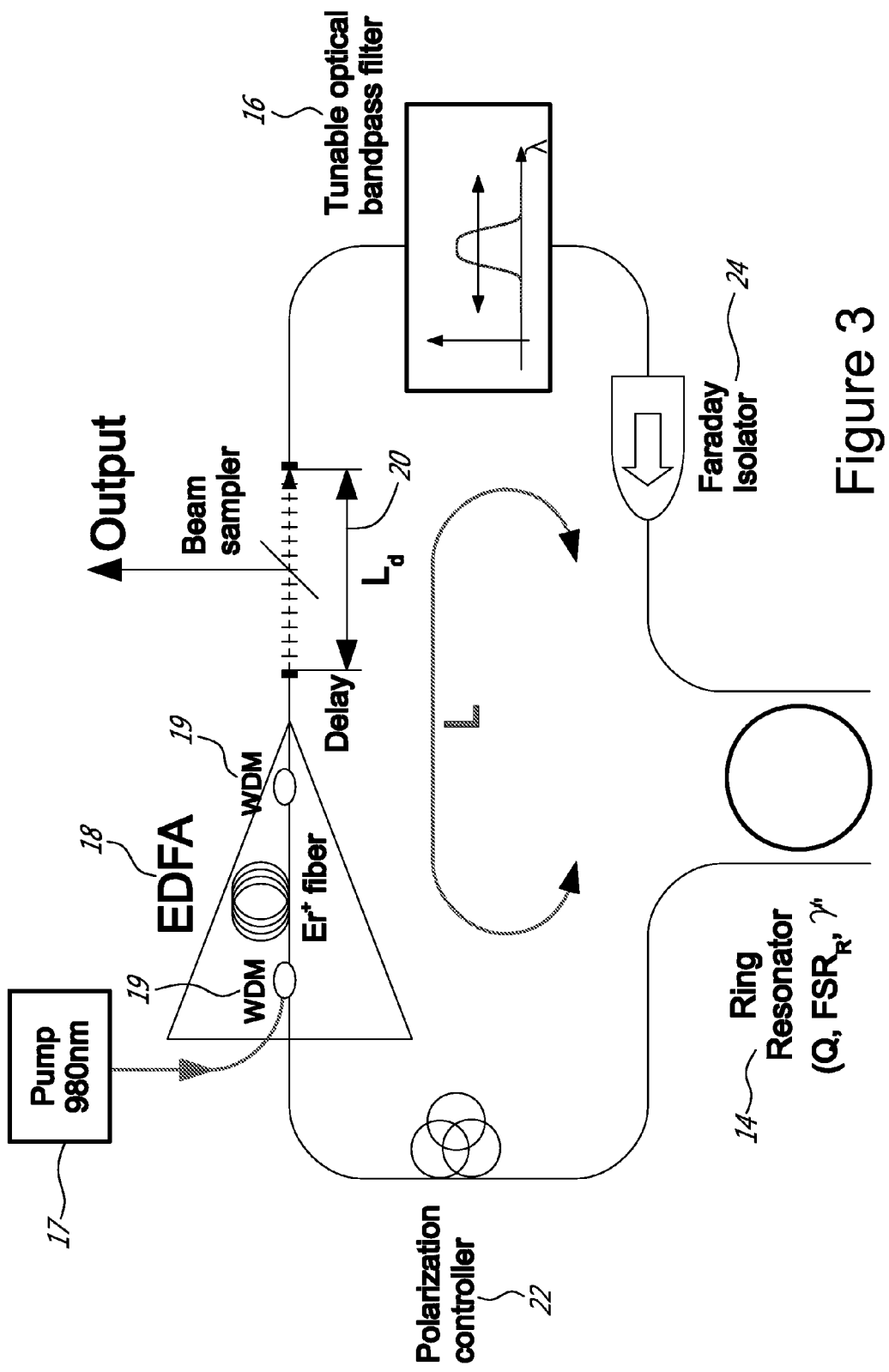
FIG. 3 is schematic view of a laser system according to an embodiment of an aspect of the present invention.

In an embodiment illustrated in FIG. 3, the system comprises a fiber optical cavity of a total approximated length of L=3 m embedding a nonlinear resonator 14, a pass-band optical filter 16, an Erbium doped fiber amplifier 18 and an optical delay line 20 of length $L_d$. The amplifier 18 is pumped with a standard 980 nm fibered optical pump 17 isolated from the laser cavity using two standard WDM filters 19. The laser output is realized by sampling the optical field within the delay line 20. A polarization controller 22 is used to optimize the polarization state at the input of the nonlinear ring resonator 14 and a Faraday isolator 24 is used to define the direction of circulation of the optical pulse within the main fiber cavity.

Numerical simulations analysis are performed by solving the coupled equations (1) of FIG. 4d, of the field evolution f(z,t) in the amplifying fiber and of the field a(z,t) evolution in the resonator (see FIG. 4a), where c is the speed of light, $n_F$, $n_R$ and ($β2_F$), ($β2_R$ are the group indices and second order dispersion in the fiber (F) and in the resonator (R), respectively; γ is the Kerr nonlinear coefficient in the resonator; and α is the linear absorption for the fiber (F). In equation (2) of FIG. 4d, g(f) is the saturable gain, $G_0$ and $P_0$ representing the fiber low-signal gain and the amplifier saturation power, which controls the energy in the laser cavity, and L being the main cavity length. Ω regulates the fiber gain bandwidth. t and r define the coupling between the fields a and f at the input (in) and the output (out) of the ring resonator. The equations of FIG. 4d are solved in time with a pseudo-spectral method and are coupled at the ring ports according to the relation in equation (3) of FIG. 4d (see FIGS. 5, 6 and 7).

FIGS. 4a-4d show a definition of the control parameters in a numerical analysis according to an embodiment of an aspect of the present invention; here and anywhere in the text, z and t are the spatial and temporal propagation coordinate respectively; a(z,t) is the field inside the ring resonator and f(z,t) is the field inside the main laser cavity. The optical output is defined as f(0,t). The radio frequency (RF) output is defined as the power $|f(0,t)|^2$ operatively detected using an electronic photodetector (i.e. its spectrum being limited to radio frequencies).

As shown in FIGS. 4, $Φ_{MC}$ dictates the initial position of the main cavity modes with respect to the ring modes, with $Φ_{MC}$=0 indicating the initial perfect alignment between them. Note that the nonlinear interaction introduces a power dependent phase contribution. Simulations shows that stable operating condition can be achieved also for main cavity modes initially not centered with the resonator resonance. $Φ_{RC}$ fixes the position of the ring modes with respect to the center of the gain bandwidth.

The simulations were performed for a 200 GHz repetition rate system, starting from noise and letting the system reach the stationary state. The operation is investigated for a ring line $LW_R$=12 GHz. The dispersion is scaled accordingly to obtain a total dispersion corresponding to the physical setup. The results are presented in terms of oscillation optical bandwidth measured in unit of the ring resonator $FSR_R$ (RC mode) and amplitude low frequency bandwidth (RF BW) expressed in unit of the main cavity $FSR_C$ (MC mode). The output is stable when the amplitude exhibits a very narrow peak around the 0 frequency, i.e. the amplitude of the pulse train does not exhibit significant low-frequency modulation.

FIGS. 5 show results of the simulation in the case of an even number of modes within the gain bandwidth with $FR_c=p/2$ (FIG. 5d), at $FSRc=4.0\ LW_R$ (FIG. 5a), $FSRc=0.8\ LW_R$ (FIG. 5b) and $FSRc=0.4\ LW_R$ (FIG. 5c), at different resonator input powers. When $FSR_c$ is significantly larger than $LW_R$, the RF BW is always close to zero (FIG. 5a). When $FSR_c$ is comparable to $LW_R$, $\Phi_{MC}$, i.e. the main cavity length, and the resonator input power affect the stability (FIG. 5b).

FIGS. 6 show results of the simulation in the case of an odd number of modes within the gain bandwidth with $FR_c=p/2$ (FIG. 6d), at $FSRc=4.0\ LW_R$ (FIG. 6a), $FSRc=0.8\ LW_R$ (FIG. 6b) and $FSRc=0.4\ LW_R$ (FIG. 6c) at different resonator input Powers;

FIGS. 7 present results of the simulation in the case of an even number of modes within the gain bandwidth with $FR_c=0$ (FIG. 7d) at $FSRc=4.0\ LW_R$ (FIG. 7a), $FSRc=0.8\ LW_R$ (FIG. 7b) and $FSRc=0.4\ LW_R$ (FIG. 7c), at different resonator input powers, by showing a detail of the output spectrum and the temporal evolution of the output power, the central resonator line being presented magnified in the inset. As the laser becomes unstable, each resonator resonance is filled with multiple oscillating main cavity line;

FIG. 8a shows the typical output spectrum and FIG. 8b shows second-order non-collinear autocorrelation for a comparable system of the prior art with a long main cavity (unstable configuration). Those measurements have been performed using a similar set up with a very long external cavity having $FSR_c=6$ MHz (33 meter of SMF), i.e. by removing the required stability condition, and for different resonator input powers, from 5.5 to 67.8 mW (input powers and amplifier pump currents are indicated in the inset). The mode-locked pulsed emission is highlighted by the spectrum shape and autocorrelation profile. Note that the stability cannot be consistently addressed in those measurements.

Figures 9A, 9B:
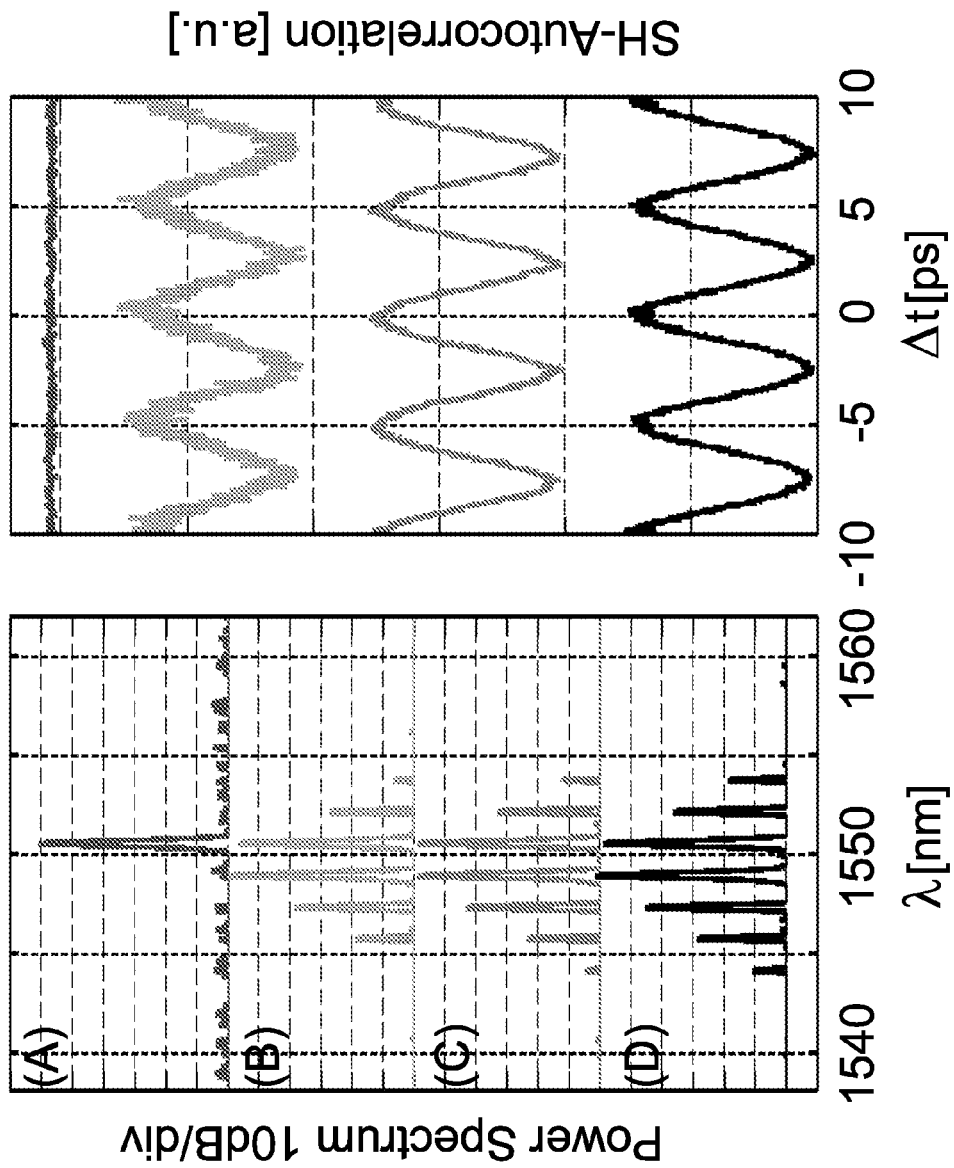
FIG. 9a shows a typical output spectrum and FIG. 9b shows autocorrelation for a system according to an embodiment of the present invention with a short main cavity (stable configuration), for different input powers in the resonator (7, 11.4, 14, 15.4 mW)

FIG. 9a shows the typical output spectrum and FIG. 9b shows autocorrelation for a system according to an embodiment of the present invention with a short main cavity (stable configuration), for different input power in the resonator (7, 11.4, 14, 15.4 mW). The mode-locked pulsed emission is highlighted by the spectrum shape and autocorrelation profile. Note that the stability cannot be consistently addressed in those measurements.

FIG. 10 show the stability of the system according to an embodiment of the present invention in comparison with the stability of a similar system with a long external cavity as known in the art. The laser amplitude noise is used to assess the stability and was determined by measuring the spectrum of the electrical radio-frequency (RF) output collected using a fast photodetector (bandwidth 200 MHz). For the stable case (a, d), the RF signal exhibited a dominant DC component with a bandwidth <0.25 Hz, which corresponds to the resolution of the measurement system, as well as an out-of-band noise 55 dB lower than the DC peak. The ratio $\Gamma_s$ between the power of the DC component and spectral noise (within the 200 MHZ bandwidth) is estimated to be above 41 dB, again limited by the sensitivity of the measurement, which in the present system is dictated by detection and sampling noise. Those results are compared with the present system with a wrong main cavity delay (b, e) and with a design having a long cavity (c,f), both being unstable. For the case presented in (b) and (c), the RF bandwidth is very large and the DC component brings a quite weak spectral contribution, the ratio $\Gamma_s$ always being <<0 dB. For the case (c), this ratio $\Gamma_s$ is estimated to be lower than −13 dB.

In high-quality-factors resonators, optical fields having wavelength matching a resonance condition undergo severe intensity enhancement due to the constructive interference between the field circulating in the resonator and the field coupled at the input. Intensity dependent optical nonlinearities are then greatly enhanced. In stark contrast with the standard DFWM method and system, the present invention provides embedding the nonlinear element in the passive mode locking scheme directly into the filter.

Previous long cavity DFWM mode-locking systems for very high repetition rate are not stable, as described hereinabove; the pulse train at the output is usually characterized by severe low frequency amplitude modulation, strongly limiting the general interest of those devices to deploy industrial applications. In addition, this effect significantly broadens the width of the laser spectral lines, which therefore cannot be used as frequency reference in meteorological application for example.

In stark contrast with regular lasers, and not only fiber based lasers, the present invention allows to obtain very high repetition rate without the requirement of very short laser cavities. The present stable system hence is capable to operate with long laser cavity, potentially providing significantly narrower laser spectral lines in principle not related to the desired repetition rate.

As people in the art will appreciate, the present invention presents a mode-locked laser based on a nonlinear high-Q resonator that achieves extremely stable operation at high repetition rates while maintaining very narrow linewidths, thus leading to a high quality pulsed emission.

As people in the art will appreciate, the present system uses a resonator with a quality factor high enough i) to enable an enhanced nonlinearity, which in turn requires lower external gain, and allow a shorter external cavity; and ii) to exhibit narrow bandwidths. Both features contribute to a resonator bandwidth comparable with, or smaller than, the main cavity mode separation, and enable stable operations.

Moreover, the present system and method provide an adjustable/matched main cavity length to achieve stable operation.

As people in the art will now be in a position to appreciate, the present invention provides a stable mode-locked laser with the characteristic repetition rate of a very short cavity with the narrow oscillation lines bandwidth characteristic of a much longer cavity, i.e. 3000 times longer for example. The bandwidth of these oscillation lines does not in principle depend on the laser repetition rate. As long as the resonator resonances have bandwidth comparable to the main cavity free-spectral range, the repetition rate is simply the free-spectral range of the resonator. The present system can oscillate at an arbitrary wavelength. As long as the external cavity provides the required dispersion, the central oscillation wavelength can be tuned with the passband filter in the main cavity and a stable operating condition can be always found adjusting the main cavity delay line. The high nonlinearity of the high-Q nonlinear resonator reduces the need of a long amplification path in the external cavity. The high-Q of the nonlinear resonator corresponds to a narrow bandwidth of its resonances. These two factors enable the external cavity free-spectral range to be comparable to the bandwidth of the nonlinear resonator opening the access to stable operating regimes.

The present method allows the realization of a stable-mode-locked laser having very high repetition rate (>100 GHz) in principle not dependent on the main cavity length that can have free-spectral-range (FSR) orders of magnitude lower than the repetition rate.

The present system and method provide highly stable pulse streams, which are required for time division multiplexing in optical telecom channels and in optical sampling systems. Moreover, high repetition rate lasers are used for high speed optical clock distribution for the synchronization of different optical devices. With respect to high repetition rate multiplexed source, an inherently mode-locked laser is characterized by a phase relation between pulses and can be applied in phase-keyed optical telecommunication channels. Optical frequency comb generation are devices where the creation of a series of equally spaced spectral lines enables direct measurement of the optical spectrum on an unknown source with high spectral accuracy. This accuracy is related to a particularly narrow bandwidth of the comb line hence this application is particularly suited for the present source.

Although the present invention has been described hereinabove by way of embodiments thereof, it may be modified, without departing from the nature and teachings of the subject invention as defined in the appended claims.

What is claimed is:

1. A laser system, comprising:
   a high-Q nonlinear optical resonator;
   a cavity, comprising an amplifying element and a dispersive element;
   an optical delay line, adapted to tune the length of the cavity; and
   a large pass-band filter adapted to tune the cavity's central oscillation wavelength,
   wherein said cavity has a mode separation of the same order of magnitude of the bandwidth of said resonator, to produce a stable mode-locking and a pulsed emission at high repetition rates independent on the cavity length.

2. The laser system of claim 1, wherein said cavity comprises a single-mode fiber and an Erbium-doped fiber amplifier.

3. The laser system of claim 1, wherein said high-Q nonlinear optical resonator is a ring resonator.

4. The laser system of claim 1, wherein said cavity comprises a single-mode fiber and an Erbium-doped fiber amplifier, said high-Q nonlinear optical resonator is a ring resonator.

5. The laser system of claim 1, wherein said cavity has a total approximated length of L=3m or shorter and said high-Q nonlinear optical resonator is a ring resonator with quality factor $Q=1.2\times10^6$.

6. The laser system of claim 1, wherein, in operation, only one main cavity mode per resonance of the resonator oscillates.

7. A method for generating highly stable pulse streams, comprising:
   providing a high-Q nonlinear optical resonator;
   providing a cavity, comprising an amplifying element and a dispersive element, wherein the cavity has a mode separation of the same order of magnitude of the bandwidth of the resonator, to produce a stable mode-locking and a pulsed emission at high repetition rates independent on the cavity length;
   providing an optical delay line, adapted to tune the length of the cavity;
   providing a large pass-band filter adapted to tune the cavity's central oscillation wavelength;
   tuning the length of the cavity; and
   tuning the cavity's central oscillation wavelength.

* * * * *